3,018,274
VINYL ACETATE COPOLYMERS
Alio J. Buselli, New Providence, N.J., and Sidney Ariemma, Staten Island, N.Y., assignors to Air Reduction Company, Incorporated, New York, N.Y., a corporation of New York
No Drawing. Filed Mar. 5, 1957, Ser. No. 643,932
4 Claims. (Cl. 260—80.5)

This invention relates to a process of preparing vinyl acetate copolymers for use in compounding chewing gum bases. The invention more specifically comprises the copolymerization of vinyl acetate together with vinyl stearate or vinyl pelargonate with $\alpha,\alpha'$-azodiisobutyronitrile as the polymerization catalyst. The invention also includes the use of specific chain transfer agents, namely, allyl acetate and n-dodecyl mercaptan.

The chewing gum base now extensively used is gum chicle. Because of the expensiveness of this material and its other known disadvantages, various substitutes have been proposed in the past either as extenders or complete substitutes for the gum chicle. The use of polyvinylesters as substitutes and extenders for chicle has been mentioned.

These prior polyvinyl ester polymers which have been suggested as being useful in chewing gum as extenders or substitutes for chicle have all possessed certain disadvantages which prevented their commercial use. For example, most polyvinyl acetate homopolymers are readily plasticized by water, and the resiliency and the consistency of the resins change with chewing. These prior polyvinyl esters also possess various other disadvantages which prevent their use as chewing gum bases such as toxicity, unpleasant odor, disagreeable taste, coloration, stickiness, etc.

According to this invention polyvinyl acetate copolymers are formed with vinyl stearate or vinyl pelargonate in such a manner so as to result in the production of a polyvinyl ester copolymer having the desired viscosity, resiliency, and consistency for a chewing gum base. The copolymers produced according to this invention are not readily plasticized by water and they therefore retain the desired viscosity, resiliency, and consistency with chewing. The vinyl ester copolymers of this invention are also non-toxic, clear, odorless, tasteless, colorless and non-sticky.

The polymerization of vinyl acetate together with vinyl stearate or vinyl pelargonate is carried out by suspension polymerization in the presence of $\alpha,\alpha'$-azodiisobutyronitrile as a polymerization catalyst. We have found that with the use of this particular catalyst in a suspension polymerization process that the resulting copolymers possess all of the advantages set forth above.

It is also important to control the viscosity of the resulting copolymers and to obtain the same in the most desirable viscosity range for use as a chewing gum base. The specific viscosity of the resulting copolymers is not critical and can readily be varied depending upon the particular viscosity desired. Vinyl acetate copolymers having an intrinsic viscosity in benzene of approximately 0.32 are particularly advantageous for use as a chewing gum base.

This invention also includes the use of particular chain transfer agents in the polymerization reaction, namely, allyl acetate and n-dodecyl mercaptan to control the ultimate viscosity of the resulting copolymer. We have found that by using chain transfer agents the vinyl acetate copolymers of vinyl stearate and vinyl pelargonate produced according to this invention retain all of their advantages for use as a substitute for chicle.

In practicing our invention, the vinyl stearate and the vinyl pelargonate can be copolymerized with the vinyl acetate in varying proportions. It is advantageous, however, to maintain the ratio of the vinyl stearate and vinyl pelargonate to between about 5 to 30% by weight of the copolymer. A vinyl acetate copolymer containing about 20% vinyl stearate or vinyl pelargonate is most advantageous.

Vinyl stearate and vinyl pelargonate as commercially available are not pure monomers. Vinyl stearate, for example, contains varying amounts of vinyl palmitate while vinyl pelargonate contains varying amounts of azelaic vinyl esters. Both the impure and pure vinyl stearate and vinyl pelargonate can be used according to this invention.

The amounts of $\alpha,\alpha'$-azodiisobutyronitrile which can be used to polymerize the reaction according to this invention can be varied within reasonable limits as will be apparent to those skilled in the art. The lower limit which can be used should be sufficient to promote the reaction at a reasonable rate while the upper limit would be more controlled by economic considerations. We have found that it is advantageous to utilize about 1% by weight of the $\alpha,\alpha'$-azodiisobutyronitrile based on the total weight of monomer being polymerized.

The amounts of chain transfer agents which can be used according to this invention are more or less dictated by the desired molecular weight of the resulting copolymer. The amount of chain transfer agent utilized can be readily determined by those skilled in the art by routine experimentation bearing in mind the desired resulting molecular weight or intrinsic viscosity of the copolymer to be produced.

We have found that when using n-dodecyl mercaptan as a chain transfer agent it is advantageous to utilize about 10% by weight based on the total weight of the monomer being polymerized. This amount of n-dodecyl mercaptan results in the production of a copolymer having the desired and advantageous intrinsic viscosity of about 0.32.

When using allyl acetate as a chain transfer agent, we have found that it is advantageous to utilize between 15 to 20% by weight of the allyl acetate based on the total weight of the monomer content being polymerized. When using allyl acetate in these proproportions, the resulting copolymer has intrinsic viscosities varying from about 0.28 to 0.38.

The polymerization of vinyl acetate together with vinyl stearate or vinyl pelargonate can be carried out by conventional and known suspension polymerization techniques. One manner of carrying out the polymerization reaction is to mix together in a reaction vessel distilled deionized water was a dispersing medium for the monomers together with suspending or dispersing agents such as polyvinyl alcohol and trisodium phosphate.

An oil solution of the monomers together with the catalyst and chain transfer agent can then be prepared and suspended in the aqueous solution in the reaction vessel by continuous agitation sufficient to maintain the monomer droplets in a dispersed phase.

The reactants and reaction vessel are then flushed with nitrogen gas and heated to the reaction temperature. The entire reaction is carried out in a nitrogen atmosphere and the heating is continued with the stirring until the polymerization is complete.

Various reaction temperatures can be used to promote the polymerization reaction according to this invention as is well-known in the art. We have found that it is advantageous to carry out the reaction at a mean temperature of about 55° C. although higher and lower temperatures could be used if desired.

After the copolymer has been formed it can be purified by washing it with water in the reaction vessel followed by steam distillation and a final wash with hot water. The copolymers can be dried by heating them in a vacuum oven.

The copolymers produced according to this invention may be readily incorporated with fillers, plasticizers, softeners, sugar, flavoring matter, and the like and may be formed into sticks, sheets, or pellets which, at ordinary temperatures, exhibit similar properties as ordinary unchewed chicle gum. When chewed, the copolymers of this invention take up moisture and become soft and ductile primarily due to attainment of body temperature.

*Example 1*

An aqueous solution was prepared by dispersing in a reaction vessel 1,467.2 grams of distilled deionized water, 30.0 grams of trisodium phosphate, and 60.0 grams of a 1% solution of polyvinyl alcohol, marketed by Colton Chemical Company under the trade name Vinol PA–40. The aqueous solution in the reaction vessel was then stirred with impellers at a speed of 300 r.p.m.

An oil solution was prepared containing 800.0 grams of vinyl acetate monomer, 200.0 grams of vinyl stearate monomer, 10.0 grams of $\alpha,\alpha'$-azodiisobutyronitrile, and 100.0 grams of n-dodecyl mercaptan and the oil monomer solution added to the stirred aqueous solution in the reaction vessel. The stirring of the reaction mixture was continued by means of the impellers until the monomers were thoroughly dispersed therein. The reaction mixture was then flushed with nitrogen gas for one-half hour and then heated by means of a water bath to 55° C. The heating of the reaction mixture was continued with stirring for four hours under a nitrogen atmosphere to complete the reaction. An additional charge of 2.5 grams $\alpha,\alpha'$-azodiisobutyronitrile was added to the reaction mixture after three hours reaction time to complete the polymerization.

The vinyl acetate-vinyl stearate copolymer was then washed three times with water in the reaction vessel and steam distilled for three hours. The vinyl acetate-vinyl stearate copolymer was then further washed three times with hot water (90° C.) and collected. The copolymer was dried by heating the polymer in a vacuum oven for twenty-four hours at a temperature of 40° C.

The resulting copolymer was clear, free from color, tasteless, odorless, non-tacky, and had an intrinsic viscosity in benzene of 0.32.

*Example 2*

A solution comprising 1,467.2 grams of distilled deionized water, 30.0 grams of trisodium phosphate, and 60.0 grams of a 1% solution of polyvinyl alcohol (Vinol PA–40) was prepared in a reaction vessel.

An oil solution comprising 800.0 grams vinyl acetate, 200.0 grams vinyl stearate, 20.0 grams of $\alpha,\alpha'$-azodiisobutyronitrile, and 200.0 grams of allyl acetate was formed and added to the aqueous solution in the reaction vessel. The reaction mixture was stirred with impellers at a speed of 300 r.p.m. and the monomers thoroughly dispersed throughout the aqueous phase. The reaction mixture was then flushed with nitrogen gas for one-half hour. The reaction mixture was heated by means of a water bath to 55° C. The stirring was continued for six hours while maintaining the reaction mixture under a nitrogen atmosphere and at a mean reaction temperature of 55° C. throughout the six hour reaction period. An additional charge of 2.5 grams of $\alpha,\alpha'$-azodiisobutyronitrile was added to the reaction mixture after three hours' reaction time to complete the polymerization.

The polymer was then washed three times with water in the reaction vessel and steam distilled for three hours. The polymer was again washed three times with hot water (90° C.) and collected. The vinyl acetate-vinyl stearate copolymer was then dried in a vacuum oven for twenty-four hours at a temperature of 40° C.

The vinyl acetate-vinyl stearate copolymer had an intrinsic viscosity in benzene of 0.28. The copolymer was also clear, free from color, odorless, tasteless, and non-tacky. The copolymer also showed little change in resiliency and consistency with extended chewing.

*Example 3*

A vinyl acetate-vinyl pelargonate copolymer was prepared and purified in exactly the same manner as set forth in Example 2 utilizing 1,467.2 grams of distilled deionized water, 30.0 grams of trisodium phosphate, and 60.0 grams of a 1% solution of polyvinyl alcohol as the aqueous solution, and 800.0 grams of vinyl acetate, 200.0 grams of vinyl pelargonate, 20.0 grams of $\alpha,\alpha'$-azodiisobutyronitrile, and 200 grams of allyl acetate as the oil solution.

The reaction in preparing the copolymer in this example was continued for eight hours.

The resulting vinyl acetate-vinyl pelargonate copolymer was exceptionally clear, free from color, odorless, tasteless, and non-tacky. The copolymer had an intrinsic viscosity in benzene of 0.28 and showed very little change in resiliency and consistency upon extended chewing.

*Example 4*

A vinyl acetate-vinyl pelargonate copolymer was prepared in exactly the same manner as set forth in Example 3 with the exception that 100.0 grams of n-dodecyl mercaptan were substituted for the 200 grams of allyl acetate.

The resulting vinyl acetate-vinyl pelargonate copolymer had an intrinsic viscosity in benzene of 0.38, was free from color, exceptionally clear, odorless, tasteless, and non-tacky.

We claim:
1. A method for preparing a chewing gum base which comprises copolymerizing by suspension polymerization in the presence of $\alpha,\alpha'$-azodiisobutyronitrile as a polymerization catalyst vinyl acetate, from about 5 percent to about 30 percent by weight of total monomers of a vinyl ester selected from the group consisting of vinyl stearate and vinyl pelargonate and an amount of a chain transfer agent such that the copolymer formed has an intrinsic viscosity of about 0.28 to 0.38, said chain transfer agent being allyl acetate.
2. The method of claim 1 wherein the vinyl ester is vinyl stearate.
3. The method of claim 1 wherein the vinyl ester is vinyl pelargonate.
4. The chewing gum base prepared according to the method of claim 1.

References Cited in the file of this patent

UNITED STATES PATENTS

| | | |
|---|---|---|
| 2,118,864 | Reppe et al. | May 31, 1938 |
| 2,390,099 | Harmon | Dec. 4, 1945 |
| 2,471,959 | Hunt | May 31, 1949 |
| 2,584,126 | Hanford | Feb. 5, 1952 |
| 2,596,852 | Heggie | May 13, 1952 |
| 2,600,385 | Bauer et al. | June 17, 1952 |
| 2,628,221 | Marsh | Feb. 10, 1953 |

OTHER REFERENCES

Swern et al.: J.A.C.S., July 1948, 70, pp. 2334–2339.